United States Patent

Ushida

[11] 4,403,835
[45] Sep. 13, 1983

[54] OBJECTIVE LENS FOR MICROSCOPE

[75] Inventor: Kazuo Ushida, Tokyo, Japan

[73] Assignee: Nippon Kogaku K.K., Tokyo, Japan

[21] Appl. No.: 248,352

[22] Filed: Mar. 27, 1981

[30] Foreign Application Priority Data

Apr. 5, 1980 [JP] Japan .................................. 55-44808

[51] Int. Cl.³ ............................................ G02B 21/02
[52] U.S. Cl. ............................................ 350/414
[58] Field of Search .......................................... 350/414

[56] References Cited
U.S. PATENT DOCUMENTS 2,533,371 12/1950 Heine .................................. 350/414
4,059,342 11/1977 Tojyo .................................. 350/414

*Primary Examiner*—John K. Corbin
*Assistant Examiner*—Scott J. Sugarman
*Attorney, Agent, or Firm*—Shapiro and Shapiro

[57] ABSTRACT

An objective lens for microscope includes, in succession from the object side, a first lens group having a cemented meniscus lens component having its concave surface facing the object side, a second lens group having a positive lens component movable in the direction of the optical axis, and a third lens group having a positive refractive power. Thus, by moving the second lens group a predetermined amount along the optical axis in accordance with the thickness of a parallel planar member disposed between the object surface and the objective lens, aberrations varied by the parallel planar member are corrected.

12 Claims, 8 Drawing Figures

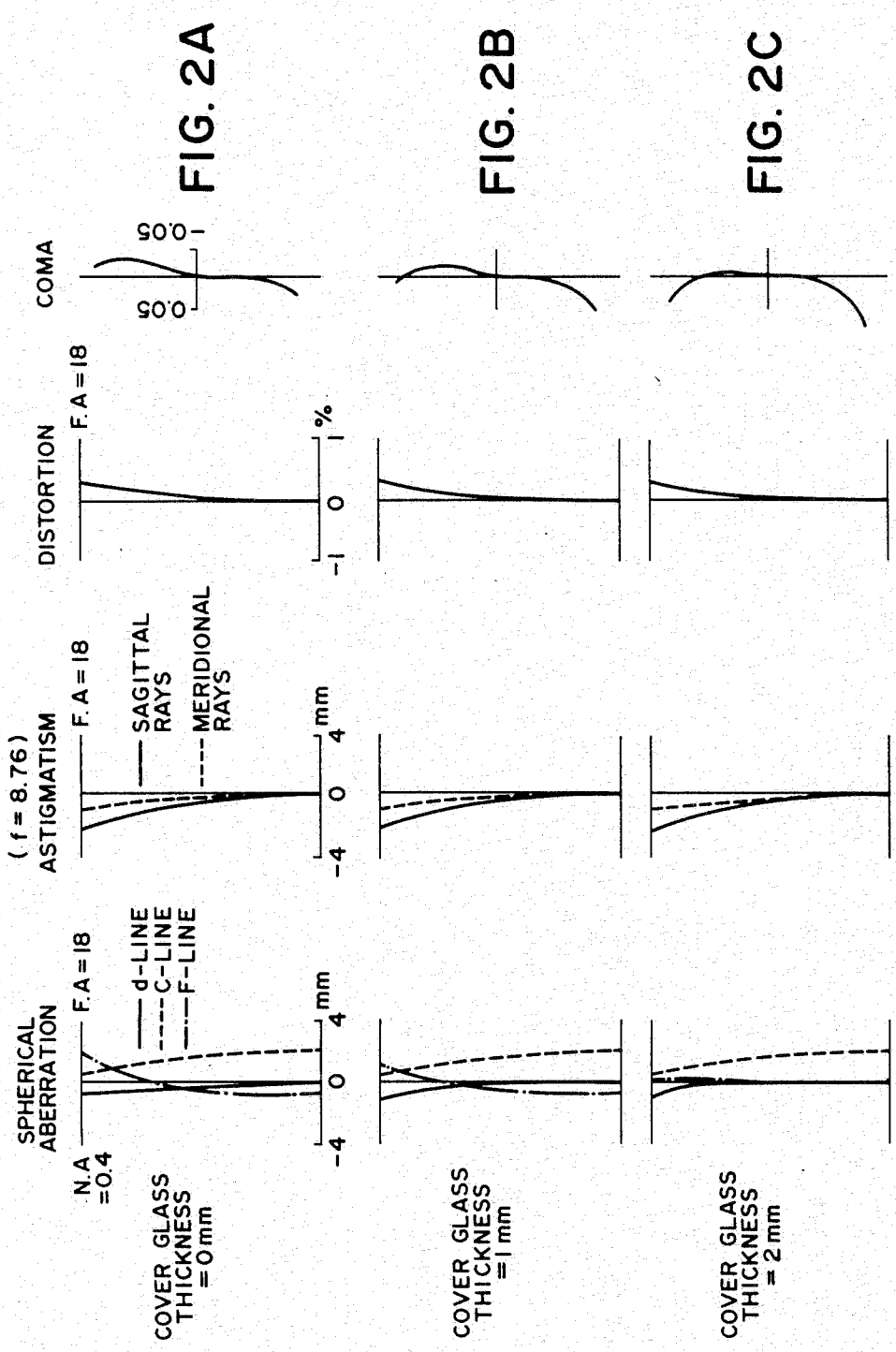

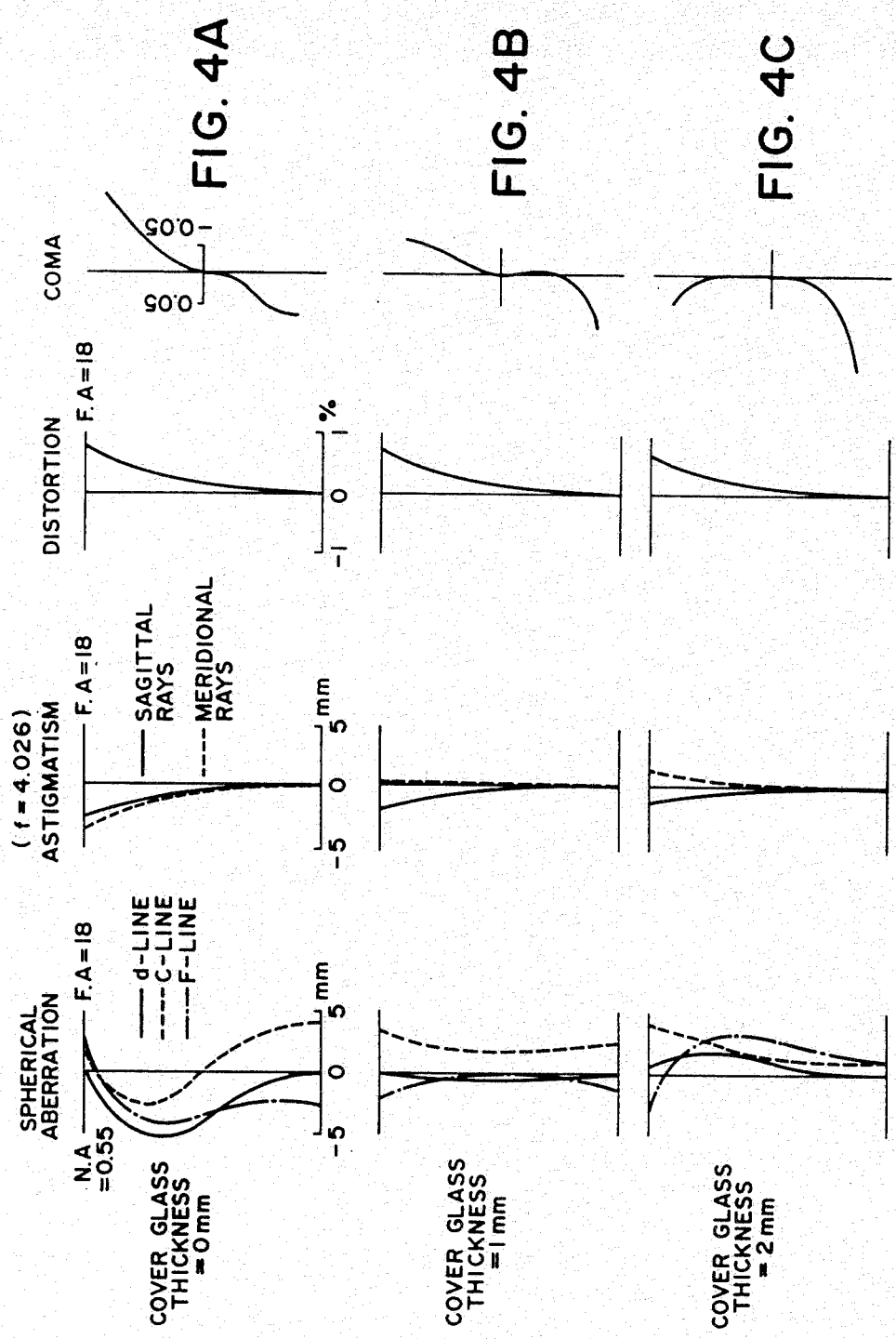

OBJECTIVE LENS FOR MICROSCOPE

BACKGROUND OF THE INVENTION

1. Field of the Invention

This invention relates to an objective lens for microscope.

2. Description of the Prior Art

In an objective lens for microscope, if NA exceeds 0.3-0.4, the variation in aberration by a parallel planar glass lying between the lens and an object may become significant. Particularly, where the thickness of the parallel planar plate is about 1 mm and is greatly irregular as in a case where observation is effected through the bottom of a "Schale" in the field of tissue culture, aberration fluctuation is great with ordinary lenses and the image may be disturbed. This tendency increases as the NA of the objective lens is increased. A method whereby a suitable lens spacing is selected and such spacing is expanded or contracted by a cam operatively associated with a correction ring to thereby negate the aforementioned aberration fluctuation is known and has been often used. However, it is rare that the aberration fluctuation by the parallel planar plate and the aberration fluctuation caused when the lens spacing is changed negate each other successfully. Therefore, with the conventional objective lens provided with a correction ring, aberrations could not be completely corrected when the thickness of the parallel planar glass fluctuated greatly, and accordingly, the correction range was narrow and aberrations were unsatisfactory in the vicinity of the limit of the correction range. Furthermore, where such objective lens is used as a phase difference objective lens, if the phase difference plate lies rearwardly of the lens spacing (toward the image side), the phase difference plate will deviate from the focus position of the lens when this lens spacing is changed by means of the correction ring. For this reason, the phase ring must be made larger in width to provide for a margin, as a result of which the contrast of the image is reduced. Such disadvantage is unavoidable with the conventional correction system because, in practice, it is almost impossible for the phase difference plate lie forwardly of the lens spacing used for correction (toward the object side).

SUMMARY OF THE INVENTION

It is an object of the present invention to provide an objective lens for microscope in which aberration fluctuation is small even if the thickness of a parallel planar glass such as a cover glass disposed between the object surface and the objective lens is greatly varied and which always has good imaging performance.

It is another object of the present invention to provide an objective lens for microscope in which fluctuation of the focus position is small even if correction of the aforementioned aberration fluctuation is effected and which can maintain good performance also as a phase difference objective lens.

The invention will become fully apparent from the following detailed description thereof taken in conjunction with the accompanying drawings.

BRIEF DESCRIPTION OF THE DRAWINGS

FIGS. 2A to 2C illustrate the aberrations in the first embodiment.

FIGS. 4A to 4C illustrate the aberrations in the second embodiment.

DESCRIPTION OF THE PREFERRED EMBODIMENTS

Figure 1:
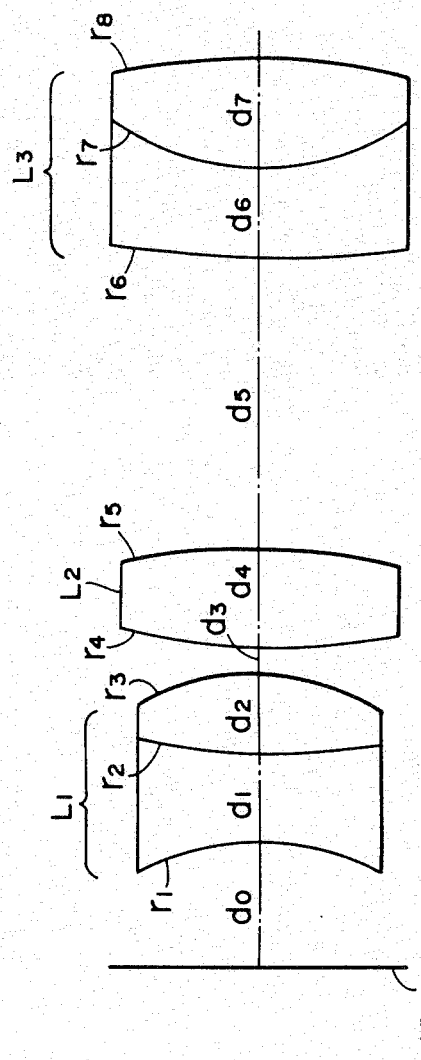
FIG. 1 is a cross-sectional view of a first embodiment of the present invention.

The objective lens according to the present invention comprises a first lens group $L_1$ which is a positive cemented meniscus lens having its concave surface facing the object side, a second lens group $L_2$ which is a positive lens or a cemented positive lens, and a third lens group $L_3$ which comprises a lens group having a positive composite refractive power, the second lens group $L_2$ being movable back and forth on the optical axis. More specifically, the second lens group is moved so as to increase the air space between the first lens group and the second lens group when the thickness of a parallel planar glass provided between the object surface and the first lens group is great and to decrease said air space when said thickness is small. As the characteristics of such objective lens of the present invention, mention may be made of the fact that aberrations can be well corrected over the wide fluctuation range of the parallel planar glass disposed between the object surface and the objective lens, and the fact that in the case of a phase difference objective, if there is a phase difference film or a phase difference plate in the third lens group, the deviation between the focal position and the phase difference film is very small even if the second lens group is moved. However, in order that correction may be well accomplished, the aberration structures of the first lens group $L_1$ and the second lens group $L_2$ should satisfy a particular condition shown below. That is, the first lens group $L_1$ should be over-corrected in respect of both spherical aberration and axial chromatic aberration and the second lens group $L_2$ should be under-corrected in respect of both spherical aberration and axial chromatic aberration. Particularly, spherical aberration of second lens group $L_2$ should be strongly under-corrected. Generally it is considered not preferable that too great a spherical aberration is produced in a particular lens element in a lens system, but in the present invention, a great spherical aberration is purposely produced in order to correct the fluctuation of spherical aberration during the fluctuation of the thickness of a cover glass. The axial chromatic aberration also fluctuates with the thickness of the cover glass, but this can also be well negated by balancing the axial chromatic aberrations of the first lens group $L_1$ and the second lens group $L_2$ in the manner described above.

In such present invention, it is desirable to further satisfy the following conditions:

$$|r_1| < 1.5f \qquad (1)$$

$$\begin{cases} \text{When } r_2 > 0, |r_2| > 1.5f \\ \text{When } r_2 < 0, |r_2| > 4f \end{cases} \qquad (2)$$

$$-1.5f < r_3 < -0.5f \qquad (3)$$

$$0.6 > n_1 - n_2 > 0.1 \qquad (4)$$

$$20 < \nu_1 < 35 \qquad (5)$$

$$97 > \nu_2 > 50 \qquad (6)$$

-continued
$$0.3 < I_k < 0.5 \quad (7)$$

where f is the total focal length of the entire lens system, $r_1$, $r_2$ and $r_3$ are the radii of curvature of the object side surface, the cemented surface and the image side surface, respectively, of the first group, $n_1$, $n_2$, $\nu_1$ and $\nu_2$ are the refractive indices and Abbe numbers of the negative and positive lenses cemented together as the first group, and $I_k$ is the tertiary aberration coefficient (spherical aberration) of the second lens group $L_2$ when $f = 1$.

These conditions will hereinafter be described in detail. If the absolute value of the radius of curvature $r_1$ of the object side surface of the first group is greater than the value shown in condition (1), it will be disadvantageous from the viewpoint of Petzual sum and also it will be difficult to make the axial chromatic aberration of the first lens group $L_1$ over-corrected. If the axial chromatic aberration of the first lens group $L_1$ is not over-corrected, the axial chromatic aberration will greatly fluctuate when the second lens group $L_2$ is moved. As regards condition (2) concerning the cemented surface in the first group, if the radius of the curvature $r_2$ of the cemented surface in the first group is positive and its absolute value is smaller than 1.5f, the function as the correcting surface for spherical aberration and axial chromatic aberration will be too strong and chromatic spherical aberration will be produced. Conversely, if $r_2$ is negative and its absolute value is smaller than 4f, the spherical aberration and chromatic aberration of the first lens group $L_1$ cannot be made overcorrected. If the radius of curvature $r_3$ of the image side surface of the first group is greater than condition (3), the light beam leaving the first lens group $L_1$ will become too divergent and too great a burden will be exerted on the second lens group $L_2$. If $r_3$ is smaller than condition (3), the light beam entering the second lens group $L_2$ will become approximately parallel and therefore, even if the second lens group $L_2$ is moved, the aberration fluctuation will be small accordingly, the effect of space correction will become weaker. Condition (4) is necessary for making the spherical aberration of the first lens group $L_1$ overcorrected, and conditions (5) and (6) are necessary for making the axial chromatic aberration of the first lens group $L_1$ over-corrected. If the spherical aberration of the first lens group $L_1$ is not made over-corrected, the correction effect by the movement of the second lens group $L_2$ will become weaker. And therefore, to correct any aberration fluctuation which may result from any fluctuation of the thickness of the same cover glass, it will become necessary to increase the amount of movement of the second lens group $L_2$. If the amount of movement of the lens group becomes greater, the aberration fluctuation will of course become so remarkable that it cannot be corrected sufficiently well. In the construction of the present invention, for example, in the case of spherical aberration, there will be no problem if the amount of fluctuation of spherical aberration resulting from any fluctuation of the thickness of the cover glass and the amount of fluctuation of spherical aberration caused by moving the second lens group $L_2$ are coincident with each other over each annular zone on the image plane, but actually there will occur a situation in which said two amounts of fluctuation are coincident with each other over a certain annular zone while they differ from each other over other annular zone. This tendency is remarkable when the stroke of the second lens group $L_2$ is great. Accordingly, the spherical aberration of the first lens group $L_1$ must be over-corrected.

Description will now be made of condition (7) which prescribes the amount of spherical aberration of the second lens group $L_2$. The tertiary aberration coefficient $I_m$ of spherical aberration in a certain lens surface, for example, the mth lens surface from the object side, is generally expressed as $$I_m = \left(\frac{h_m}{h_1}\right)^4 Q_m^2 \left(\frac{1}{N'_m S'_m} - \frac{1}{N_m S_m}\right)$$

$$Q_m = N_m \left(\frac{1}{r_m} - \frac{1}{S_m}\right)$$

where $h_1$ is the incidence height of the paraxial ray on the lens surface which is most adjacent to the object side, $h_m$ is the incident height on the mth lens surface, $N_m$ and $N'_m$ are the refractive indices of the object side and the image side, respectively, of the mth lens surface, $S_m$ and $S'_m$ are the object point distance and the image point distance with respect to this lens surface, and $r_m$ is the radius of curvature of this lens surface. As the value of the tertiary aberration coefficient $I_m$ of spherical aberration is greater, a spherical aberration greater in the negative sense is produced in this lens surface. The tertiary aberration coefficient $I_k$ of the spherical aberration in the second lens group $L_2$ is the result of adding the coefficient of each aforementioned lens surface with respect to the lens surface in the second lens group $L_2$. Accordingly, condition (7) demands that the spherical aberration of the second lens group $L_2$ be intensely under corrected. If the amount of spherical aberration produced in the second lens group $L_2$ is smaller than condition (7), the correction effect by the movement of the second lens group $L_2$ will become small and if said amount of spherical aberration is greater than condition (7), a great deal of high order spherical aberration will be produced and it will become difficult to correct this by other groups.

The numerical data of the embodiments of the present invention will be shown below. In the tables below, $r_1$, $r_2$, $r_3$, ... represent the radii of curvature of the successive lens surfaces from the object side, $d_1$, $d_2$, $d_3$, ... represent the center thicknesses and air spaces of the respective lenses, $d_0$ represents the distance from object surface to lens surface $r_1$, $n_1$, $n_2$, $n_3$, ... represent the refractive indices of the respective lenses, and $\nu_1$, $\nu_2$, $\nu_3$, ... represent the Abbe numbers of the respective lenses.

| First Embodiment: | | | |
|---|---|---|---|
| $\beta = 10^x$  NA = 0.4  $f = 1$  $d_0 = 0.3596 \sim 0.1644$ | | | |
| $r_1 = -0.9018$ | | | |
| | $d_1 = 0.2740$ | $n_1 = 1.7847$ | $\nu d_1 = 26.1$ |
| $r_2 = 2.0148$ | | | |
| | $d_2 = 0.2340$ | $n_2 = 1.6228$ | $\nu d_2 = 56.9$ |
| $r_3 = -0.6849$ | | | |
| | $d_3 = 0.0708 \sim 0.1735$ (variable) | | |
| $r_4 = 2.0808$ | | | |
| | $d_4 = 0.2854$ | $n_3 = 1.6968$ | $\nu d_3 = 55.6$ |
| $r_5 = -2.0808$ | | | |
| | $d_5 = 0.8653 \sim 0.7626$ (variable) | | |
| $r_6 = 3.8813$ | | | |
| | $d_6 = 0.2797$ | $n_4 = 1.79631$ | $\nu d_4 = 40.8$ |
| $r_7 = 0.8790$ | | | |
| | $d_7 = 0.3139$ | $n_5 = 1.5168$ | $\nu d_5 = 64.2$ |

-continued

First Embodiment:

$r_8 = -1.9521$

| Cover glass thickness | $d_0$ | $d_3$ | $d_6$ |
|---|---|---|---|
| 0 | 0.6874 | 0.0969 | 0.9215 |
| 0.2484 | 0.4216 | 0.3726 | 0.6458 |
| 0.4968 | 0.1402 | 0.6731 | 0.3453 |

FIG. 1 is a cross-sectional view of the first embodiment, in which the third lens group $L_3$ comprises a cemented positive lens component. FIGS. 2A to 2C illustrate the aberrations when the data of the first embodiment have been proportionally enlarged so that $f=8.76$ mm, and shows the aberrations corrected by movement of the second lens group $L_2$ with respect to the cases where the thickness of the cover glass is 0 mm (FIG. 2A), 1 mm (FIG. 2B) and 2 mm (FIG. 2C). As will be seen, the aberrations are well corrected with respect to a very wide fluctuation range of the cover glass thickness. Also, the phase film machining is applied to the cemented surface $r_7$ in the third group and even when the cover glass thickness is varied in the range of 0 to 2 mm, the amount of fluctuation of the focus position is very small, say, $\pm 0.07f$.

Second Embodiment:

$\beta = 40^x$  NA $= 0.55$  $f = 1$  $d = 0.6874 \sim 0.1402$
$r_1 = -1.3413$
$\quad d_1 = 0.1739 \quad n_1 = 1.7847 \quad \nu d_1 = 26.1$
$r_2 = \infty$
$\quad d_2 = 0.6706 \quad n_2 = 1.62041 \quad \nu d_2 = 60.3$
$r_3 = -1.0929$
$\quad d_3 = 0.0969 \sim 0.6731$ (variable)
$r_4 = 8.3184$
$\quad d_4 = 0.2484 \quad n_3 = 1.79631 \quad \nu d_3 = 40.8$
$r_5 = 2.5832$
$\quad d_5 = 0.8693 \quad n_4 = 1.70154 \quad \nu d_4 = 41.1$
$r_6 = -2.5832$
$\quad d_6 = 0.9215 \sim 0.3453$ (variable)
$r_7 = 21.3115$
$\quad d_7 = 0.2484 \quad n_5 = 1.75692 \quad \nu d_5 = 31.7$
$r_8 = 2.3234$
$\quad d_8 = 0.9439 \quad n_6 = 1.49782 \quad \nu d_6 = 82.3$
$r_9 = -3.0055$
$\quad d_9 = 0.0248$
$r_{10} = 4.3716$
$\quad d_{10} = 0.8942 \quad n_7 = 1.49782 \quad \nu d_7 = 82.3$
$r_{11} = -2.6851$
$\quad d_{11} = 0.2235 \quad n_8 = 1.744 \quad \nu d_8 = 44.9$
$r_{12} = 17.1312$
$\quad d_{12} = 4.5703$
$r_{13} = 12.1749$
$\quad d_{13} = 0.4471 \quad n_9 = 1.7847 \quad \nu d_9 = 26.1$
$r_{14} = -3.0864$
$\quad d_{14} = 0.3477 \quad n_{10} = 1.61266 \quad \nu d_{10} = 44.3$
$r_{15} = 2.3348$

| Cover glass thickness | $d_0$ | $d_3$ | $d_5$ |
|---|---|---|---|
| 0 | 0.3596 | 0.0708 | 0.8653 |
| 0.1142 | 0.2620 | 0.1222 | 0.8139 |
| 0.2283 | 0.1644 | 0.1735 | 0.7626 |

Figure 3:
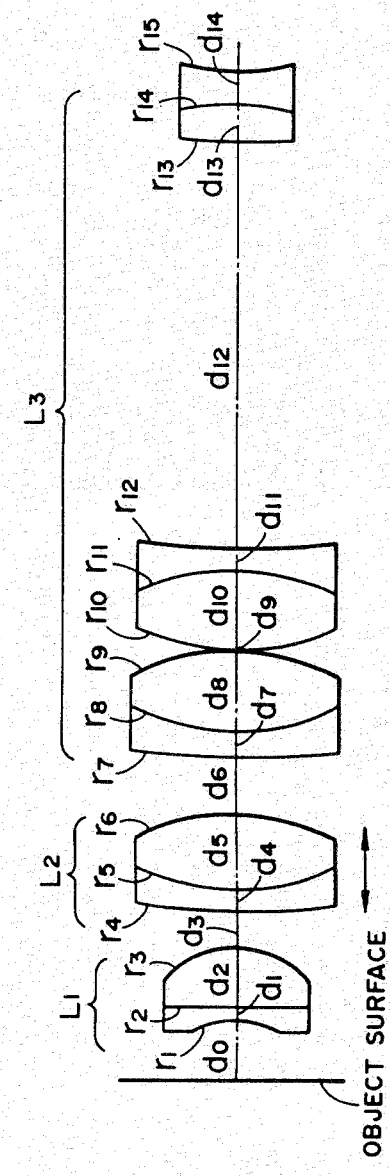
FIG. 3 is a cross-sectional view of a second embodiment of the present invention.

FIG. 3 is a cross-sectional view of the second embodiment, in which the first lens group $L_1$ comprises a cemented lens and the third lens group $L_3$ comprises two positive lenses having cemented surfaces and a cemented negative lens separated therefrom with a great air space. FIGS. 4A to 4C illustrate the aberrations when the data of the second embodiment have been proportionally enlarged so that $f=4.026$ mm, and shows the aberrations corrected by movement of the second lens group $L_2$ with respect to the cases where the thickness of the cover glass is 0 mm (FIG. 4A), 1 mm (FIG. 4B) and 2 mm (FIG. 4C). It will be seen that the correction range is very wide as in the first embodiment. Also, a phase film is provided on the cemented surface of the second cemented positive lens in the third lens group as viewed from the object side, and the amount of deviation of the focus is very small, say, $\pm 0.32f$.

The values of the tertiary aberration coefficient of spherical aberration in the second lens group $L_2$ of the foregoing two embodiments will be shown below with respect to the various thicknesses of the cover glass.

| Cover glass thickness | $I_k$ in 1st Embodiment | $I_k$ in 2nd Embodiment |
|---|---|---|
| 0 mm | 0.393 | 0.368 |
| 1 mm | 0.404 | 0.400 |
| 2 mm | 0.416 | 0.438 |

In the objective lens for microscope according to the present invention, the cemented surface in the first lens group which is convex toward the object side is a requisite cemented surface and the cemented surface in the second lens group is not requisite but is desirable for the case of high magnification. The construction of the third lens group is not restricted to those of the foregoing embodiments, but if it has a positive refractive power as a whole, various constructions will be possible.

According to the present invention, the aberrations resulting from any thickness fluctuation of the cover glass can be successfully corrected and there is little fluctuation of the focus position, which leads to the possibility of maintaining an excellent performance as an objective lens for phase difference microscope.

I claim:

1. An objective lens for microscope for observing an object through a parallel planar member disposed between said objective lens and said object including, in succession from the object side:
   a first lens group having a cemented meniscus lens component having its concave surface facing the object side;
   a second lens group having a positive lens component; and
   a third lens group having a positive refractive power;
   said second lens group being movable in the direction of the optical axis and relative to said first and third lens groups, whereby by moving said second lens group a predetermined amount along the optical axis in accordance with the thickness of the parallel planar member disposed between the object surface and said objective lens, aberrations varied by said parallel planar member are corrected.

2. An objective lens according to claim 1, wherein said positive lens component of said second lens group is movable so that when the thickness of said parallel planar member is greater, the spacing between said second lens group and said first lens group is increased and that when the thickness of said parallel planar member is smaller, the spacing between said second lens group and said first lens group is decreased.

3. An objective lens for a microscope including, in succession from the object side:
   a first lens group having a cemented meniscus lens component having its concave surface facing the object side;
   a second lens group having a positive lens component; and
   a third lens group having a positive refractive power;
   said second lens group being movable in the direction of the optical axis and relative to said first and third lens groups a predetermined amount in accordance with the thickness of a parallel planar member disposed between an object surface and said objective lens so as to correct aberrations varied by said parallel planar member, the positive lens component of said second lens group being movable so that when the thickness of said parallel planar member is increased, the spacing between said second lens group and said first lens group is increased and so that when the thickness of said parallel planar member is decreased, the spacing between said second lens group and said first lens group is decreased, and wherein said cemented meniscus lens in said first lens group has a positive refractive power and satisfies the following conditions:

$$|r_1| < 1.5f \quad (1)$$

$$\begin{cases} \text{When } r_2 > 0, |r_2| > 1.5f \\ \text{When } r_2 < 0, |r_2| > 4f \end{cases} \quad (2)$$

$$-1.5f < r_3 < -0.5f \quad (3)$$

$$0.6 > n_1 - n_2 > 0.1 \quad (4)$$

$$20 < \nu_1 < 35 \quad (5)$$

$$97 > \nu_2 > 50 \quad (6)$$

$$0.3 < I_k < 0.5 \quad (7)$$

where $r_1$, $r_2$ and $r_3$ are the radii of curvature of the object side surface, the cemented surface and the image side surface, respectively, of said cemented meniscus lens, $n_1$, $n_2$ and $\nu_1$, $\nu_2$ are the refractive indices and the Abbe numbers, respectively, of a negative lens and a positive lens forming said positive cemented meniscus lens, f is the total focal length of the entire lens system, and $I_k$ is the tertiary aberration coefficient of spherical aberration in said second lens group when f=1.

4. An objective lens according to claim 3, wherein said third lens group has a positive lens component having a cemented surface having its convex surface facing the object side.

5. An objective lens according to claim 4, wherein said positive lens component in said third lens group has a phase film on the cemented surface thereof.

6. An objective lens according to claim 4, wherein numerical data are as follows:

| $\beta = 20^x$ | NA = 0.4 | f = 1 | $d_0 = 0.3596 \sim 0.1644$ |
|---|---|---|---|
| $r_1 = -0.9018$ | | | |
| | $d_1 = 0.2740$ | $n_1 = 1.7847$ | $\nu d_1 = 26.1$ |
| $r_2 = 2.0148$ | | | |
| | $d_2 = 0.2340$ | $n_2 = 1.6228$ | $\nu d_2 = 56.9$ |
| $r_3 = -0.6849$ | | | |
| | $d_3 = 0.0708 \sim 0.1735$ (variable) | | |
| $r_4 = 2.0808$ | | | |
| | $d_4 = 0.2854$ | $n_3 = 1.6968$ | $\nu d_3 = 55.6$ |
| $r_5 = -2.0808$ | | | |
| | $d_5 = 0.8653 \sim 0.7626$ (variable) | | |
| $r_6 = 3.8813$ | | | |
| | $d_6 = 0.2797$ | $n_4 = 1.79631$ | $\nu d_4 = 40.8$ |
| $r_7 = 0.8790$ | | | |
| | $d_7 = 0.3139$ | $n_5 = 1.5168$ | $\nu d_5 = 64.2$ |
| $r_8 = -1.9521$ | | | | where $r_1$, $r_2$, $r_3$, . . . represent the radii of curvature of the successive lens surfaces from the object side, $d_1$, $d_2$, $d_3$, . . . represent the center thickness and air spaces of the respective lenses, $d_0$ represents the distance between object surface and lens surface $r_1$, $n_1$, $n_2$, $n_3$ . . . represent the refractive indices of the respective lenses, and $\nu_1$, $\nu_2$, $\nu_3$, . . . represent the Abbe numbers of the respective lenses.

7. An objective lens according to claim 3, wherein said positive lens component in said second lens group has a cemented surface having its convex surface facing the object side, and said third lens group has two positive lens components having cemented surfaces and a cemented negative lens component separated therefrom with a great air space.

8. An objective lens according to claim 7, wherein the second cemented positive lens component in said third lens group as viewed from the object side has a phase film on the cemented surface thereof.

9. An objective lens according to claim 7, wherein numerical data are as follows:

| $\beta = 40^x$ | NA = 0.55 | f = 1 | $d_0 = 0.6874 \sim 0.1402$ |
|---|---|---|---|
| $r_1 = -1.3413$ | | | |
| | $d_1 = 0.1739$ | $n_1 = 1.7847$ | $\nu d_1 = 26.1$ |
| $r_2 = \infty$ | | | |
| | $d_2 = 0.6706$ | $n_2 = 1.62041$ | $\nu d_2 = 60.3$ |
| $r_3 = -1.0929$ | | | |
| | $d_3 = 0.0969 \sim 0.6731$ (variable) | | |
| $r_4 = 8.3184$ | | | |
| | $d_4 = 0.2484$ | $n_3 = 1.79631$ | $\nu d_3 = 40.8$ |
| $r_5 = 2.5832$ | | | |
| | $d_5 = 0.8693$ | $n_4 = 1.70154$ | $\nu d_4 = 41.1$ |
| $r_6 = -2.5832$ | | | |
| | $d_6 = 0.9215 \sim 0.3453$ (variable) | | |
| $r_7 = 21.3115$ | | | |
| | $d_7 = 0.2484$ | $n_5 = 1.75692$ | $\nu d_5 = 31.7$ |
| $r_8 = 2.3234$ | | | |
| | $d_8 = 0.9439$ | $n_6 = 1.49782$ | $\nu d_6 = 82.3$ |
| $r_9 = -3.0055$ | | | |
| | $d_9 = 0.0248$ | | |
| $r_{10} = 4.3716$ | | | |
| | $d_{10} = 0.8942$ | $n_7 = 1.49782$ | $\nu d_7 = 82.3$ |
| $r_{11} = -2.6851$ | | | |
| | $d_{11} = 0.2235$ | $n_8 = 1.744$ | $\nu d_8 = 44.9$ |
| $r_{12} = 17.1312$ | | | |
| | $d_{12} = 4.5703$ | | |
| $r_{13} = 12.1749$ | | | |
| | $d_{13} = 0.4471$ | $n_9 = 1.7847$ | $\nu d_9 = 26.1$ |
| $r_{14} = -3.0864$ | | | |
| | $d_{14} = 0.3477$ | $n_{10} = 1.61266$ | $\nu d_{10} = 44.3$ |
| $r_{15} = 2.3348$ | | | | where $r_1$, $r_2$, $r_3$ . . . represent the radii of curvature of the successive lens surfaces from the object side, $d_1$, $d_2$, $d_3$, . . . represent the center thicknesses and air spaces of the respective lenses, $d_0$ represents the distance from object surface to lens surface $r_1$, $n_1$, $n_2$, $n_3$, . . . represent the refractive indices of the respective lenses, and $\nu_1$, $\nu_2$, $\nu_3$, . . . represent the Abbe numbers of the respective lenses.

10. An objective lens for microscope for observing an object through a parallel planar member disposed between said objective lens and said object to be observed, comprising in succession from the object side:
- a first lens group;
- a second lens group having a positive refractive power; and
- a third lens group having a positive refractive power;
- said second lens group being movable in the direction of the optical axis and relative to said first and third lens group so as to compensate aberrations varied by the parallel planar member.

11. An objective lens according to claim 10, wherein said second lens group is movable so that when the thickness of said parallel planar member is greater than that of a predetermined standard parallel planar member said second lens group moves toward said third lens group, and that when the thickness of said parallel planar member is smaller than that of the predetermined standard parallel planar member said second lens group moves toward said first lens group.

12. An objective lens according to claim 11, wherein said first lens group is over-corrected in respect of both spherical aberration and axial chromatic aberration, and said second lens group is under-corrected in respect of both spherical aberration and axial chromatic aberration.

* * * * *